United States Patent [19]

Spears

[11] Patent Number: 4,550,401
[45] Date of Patent: Oct. 29, 1985

[54] DELIVERY INFORMATION PACKET SWITCHING SYSTEM

[75] Inventor: Danny R. Spears, Bolingbrook, Ill.

[73] Assignee: AT&T Bell Laboratories, Murray Hill, N.J.

[21] Appl. No.: 563,997

[22] Filed: Dec. 21, 1983

[51] Int. Cl.$^4$ .......................... H04J 3/02; H04J 3/00; H04J 6/00; H04Q 11/04

[52] U.S. Cl. .................................... 370/85; 370/94; 370/60

[58] Field of Search ..................... 370/85, 86, 88, 87; 340/825.05

[56] References Cited

U.S. PATENT DOCUMENTS

| | | | |
|---|---|---|---|
| Re. 31,319 | 7/1983 | Fraser | 370/80 |
| 4,007,441 | 2/1977 | Faber | 370/88 |
| 4,284,976 | 8/1981 | Gable et al. | 340/147 |
| 4,287,592 | 9/1981 | Paulish et al. | 370/88 |
| 4,389,721 | 6/1983 | Young et al. | 370/88 |
| 4,412,326 | 10/1983 | Limb | 370/85 |

OTHER PUBLICATIONS

"Description of FASNET-A Unidirectional Local Area Communication Network", *The Bell System Technical Journal*, J. O. Limb, et al., vol. 61, No. 7, Sep., 1982, pp. 1413-1440.

*Primary Examiner*—Douglas W. Olms
*Assistant Examiner*—Wellington Chin
*Attorney, Agent, or Firm*—John C. Moran

[57] ABSTRACT

A packet switching system having local area communication networks supporting telephone trunk circuits by utilizing delivery information. The networks utilize serial, unidirectional, broadcast-type paths to which stations are passively coupled in a sequential manner; and packets transmitted on those paths each comprise an address field and a delivered bit field. The trunk circuits or common resource units are connected to a network by a group of stations which all respond to a group address. A station requiring trunk circuit facilities transmits a packet containing the group address and a delivered bit in the reset state. The first idle trunk circuit station to receive that packet makes its attached trunk circuit available to the transmitting station and sets the delivered bit indicating that a trunk circuit has been made available to the transmitting station. All subsequent stations in the group upon detecting that the delivered bit has been set ignore the packet. Similarly, the delivery information in the delivered bit field controls the transmission or communication of another packet to its destination station through serially interconnected networks, and that packet does not advance through further networks once the delivered bit has been set indicating that the other packet has been delivered to its destination. The destination station sets the delivered bit upon receipt of the packet.

16 Claims, 9 Drawing Figures

DELIVERY INFORMATION PACKET SWITCHING SYSTEM

CROSS-REFERENCE TO RELATED APPLICATIONS

J. O. Limb 20, "Collision Avoiding System and Protocol for a Multiple Access Digital Communications System", U.S. Pat. No. 4,439,763, issued on Mar. 27, 1984; Flores-Gopinath-Limb 1-5-22, "Collision Avoiding System and Protocol for a Two Path Multiple Access Digital Communication System", Ser. No. 399,428, was filed on July 19, 1982; and Flamm-Limb 1-23, "Local Area Network Packet Protocol for Combined Voice and Data Transmission", Ser. No. 499,291, was filed on May 31, 1983. All three applications are assigned to the same assignee as this application.

TECHNICAL FIELD

This invention relates to communication systems and pertains to a packet switching system utilizing delivery bits to control the transition of a packet through the switching system and to preclude unwarranted operations on the packet by an available one of a group of functional service circuits.

BACKGROUND OF THE INVENTION

Various types of local area communication networks are known, and such a network is used for example to communicate computer, video, packetized voice, and facsimile data within a single business office. One such network is described in the article by J. O. Limb and C. Flores, entitled "Description of FASNET-A Unidirectional Local Area Communications Network", *Bell System Technical Journal,* vol. 61, no. 7, September, 1982. The FASNET is an implicit token-passing, local area network aimed at supporting high data rates and carrying a wide mix of traffic such as data, voice, video and facsimile. The transmission is unidirectional with stations passively attached to the medium via unidirectional couplers. The unidirectional transmission provides efficient operation at high data rates with high reliability.

Although the FASNET network is an extremely efficient network, there exists a problem in the interconnection of multiple FASNET networks because of the use of only address information to control the internetwork transmission of packets. Such a proposal for interconnecting FASNET networks is detailed in the previously mentioned article. In this article, the interconnection proposal uses gateway stations which provide interconnection paths between the networks. A packet, which is to be transferred from a first FASNET network to a second FASNET network, is initially transmitted to the gateway station on the first FASNET network. For this transmission to occur, it is necessary for the address of the gateway station to be included in the packet and then for the packet to be transmitted from the gateway station of the first FASNET network to a second gateway station within the second FASNET network. The latter then inserts the proper address information so that the packet can be transferred to a station on the second or another FASNET network. A deficiency in such an arrangement is that the second gateway station must have access to all addresses of destination stations which it serves and must check each packet transmitted on the network to verify whether or not that packet should be transferred to another network. Verification on a per packet basis requires that many accesses be made to the address information and those accesses consume a large amount of real time and accordingly reduce the system's service capacity. Although the Limb et al. system is suitable in many applications, among its recognized deficiencies is that it requires a large number of memory units and associated controllers and does not function well when a large number of stations are being added and subtracted from the various FASNET networks, because the practical difficulties associated with administering and updating address information records which are stored in the memory units become extremely time consuming and complex. No provision is made in the Limb et al. for automatic hunting of functional service units or common resources which are grouped in a common pool to serve originating stations. Such common resources may for example comprise a hunt group of trunk circuits connected between the FASNET network and a telephone office.

Another example of a local area communication system which utilizes gateway stations for interconnecting networks is disclosed in U.S. Pat. No. 3,749,845; entitled "Digital Data Communication System". That patent discloses the use of central switching units, each attached to a particular network to perform the gateway functions for each network. A switching unit stores internally all address information for identification of stations on the attached network and performs all packet switching functions; and upon detection of a packet address not designating a station attached to the network, the switching unit transfers this packet to another network. A problem in that system is that its performance is limited to the throughput of the switching unit, because it must perform a multitude of packet processing and switching operations.

SUMMARY OF THE INVENTION

The foregoing problems are solved in accordance with the principles of this invention as disclosed in an illustrated structural embodiment in which a plurality of local area communication networks of a packet switching system are interconnected by the system operating on information within each packet indicating whether or not the packet had been previously delivered at an earlier sequential station attached to one of the networks. Advantageously, the delivery information also allows for the efficient use of common resources on any particular network.

Advantageously, the local area communication networks utilize serial, unidirectional, broadcast-type paths to which stations are passively coupled in a sequential manner; and packets transmitted on those paths each comprise an address field and a delivered bit field. The latter communicates the delivery information. Each station interrogates the address field of each packet as it passes on the path. If a station detects its own address in the address field, it removes the packet and updates the delivered bit field to indicate that the packet has been delivered to its destination and therefore need not be extended to another interconnected network. The last station on the path automatically transfers any packets whose delivered bit field has not been updated to a station attached to another local area communication network via an internetwork link. That station then retransmits the packet on the other network.

Advantageously, shared resources can be automatically utilized by a station connected to the network without that station having to first transmit a request to a central control unit or individually transmit an unique request to each shared resource. Each of the shared resources is individually connected to the network via a station. All of the stations interconnecting the shared resources to the network respond to a group address which designates any of the shared resources. A station utilizes the facilities of a shared resource by transmitting a packet containing the group address and with the delivered bit field set to the undelivered state. Each station to which a idle shared resource is connected automatically responds to the group address by updating the delivered bit field. If the delivered bit field has not been updated indicating that the packet has been delivered, the first idle shared resource station performs the predefined operation as requested by the contents of the packet. If the delivered bit field has been properly updated, the other idle shared resource stations simply ignore the packet since another one of the shared resources is presently handling the operations required by the contents of the packet.

A specific feature of the invention is a packet switching system having a plurality of stations and a switching network for communicating packets between the stations. Each of the packets comprises delivery signals and address signals. Advantageously, in response to a packet containing a particular set of address signals and a first set of delivery signals, a station reads the packet from the network. In addition, after reading the packet, the station inserts into the packet on the network a second set of delivery signals which indicate to subsequent stations that the packet has been read from the network.

Another feature of the invention is a group of stations which respond to a group address and to a first set of delivery signals to perform a predefined operation. Also connected to the network is another station which performs a set of operations including the predefined operation. The other station performs the predefined operation by transmitting a packet which comprises the group address and the first set of delivery signals on the network. The first idle station of the group to receive the packet performs the predefined operation and replaces the first set of delivery signals in the packet on the network with a second set of delivery signals indicating to all other stations in the group that the predefined operation has been performed with this packet.

BRIEF DESCRIPTION OF THE DRAWING

In general, system elements, when first introduced on a figure, are each designated with a number that uses the figure number as the most significant digits of that element number.

DETAILED DESCRIPTION

Figure 1:
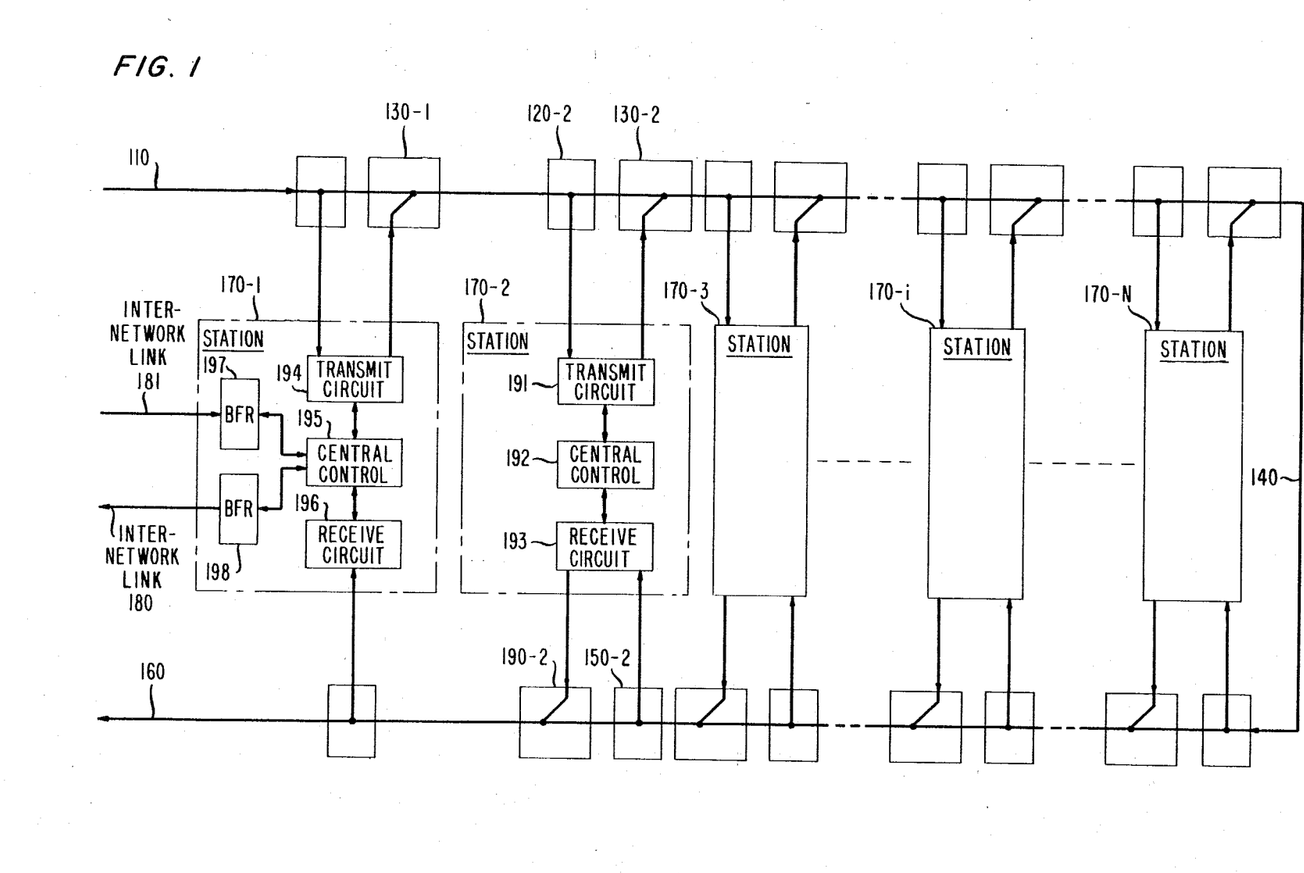
FIG. 1 illustrates, in block diagram form, a packet switching network which utilizes the present invention.

FIG. 1 shows an illustrative local area communication network serving a plurality of data stations 170-1 to 170-n with internetwork links 180 and 181 for interconnection to other networks. The network illustrated in FIG. 1 is further described in the copending application assigned to the same assignee as this application by J. O. Limb, Ser. No. 298,954; entitled "Collision Avoiding System and Protocol for a Multiple Access Data Communication System", and filed Sept. 3, 1981. The latter application is hereby incorporated by reference into this application. Transmit path 110 and receive path 160 are unidirectional, shared-medium paths interconnecting a plurality of read and transmit couplers, and the two paths are interconnected by path 140. The couplers are passively connected to the paths. Each of the stations 170-1 through 170-n is coupled to both transmit path 110 and receive path 160. On both paths, a read coupler such as read coupler 120-2, electrically proceeds a write coupler such as write coupler 130-2. The stations utilize the read couplers for reading signals being transmitted on the receive and transmit paths. This allows the stations to monitor and read signals on both the transmit path and the receive path of the network. The write couplers are utilized by a station to insert or write electrical signals from that station onto either the transmit or receive paths. In general, stations read control information from transmit path 110 and write control and data information to transmit path 110 and read control and data information from read path 160 and write only the delivery information to read path 160. The manner in which the writing and reading takes place is described later in the section dealing with the description of FIGS. 6 and 7.

Figure 2:
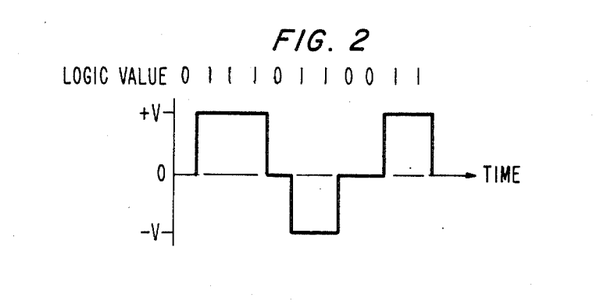
FIG. 2 illustrates a bipolar digital signal which is transmitted over the transmit and receive paths of the network of FIG. 1.
Figure 3:
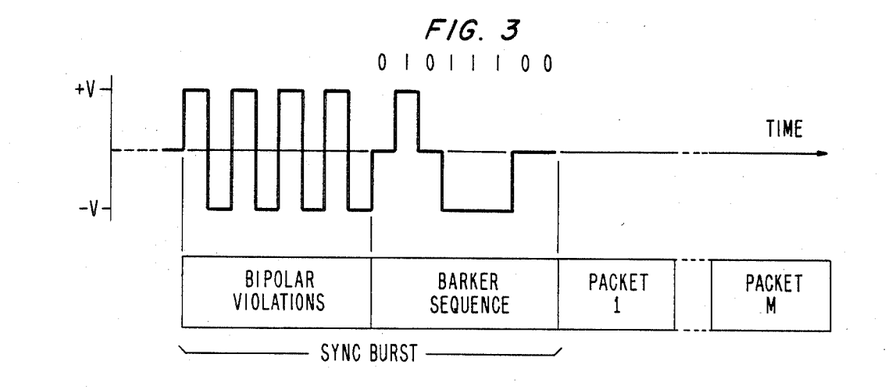
FIG. 3 illustrates a synchronizing signal for use with the network of FIG. 1.
Figure 4:
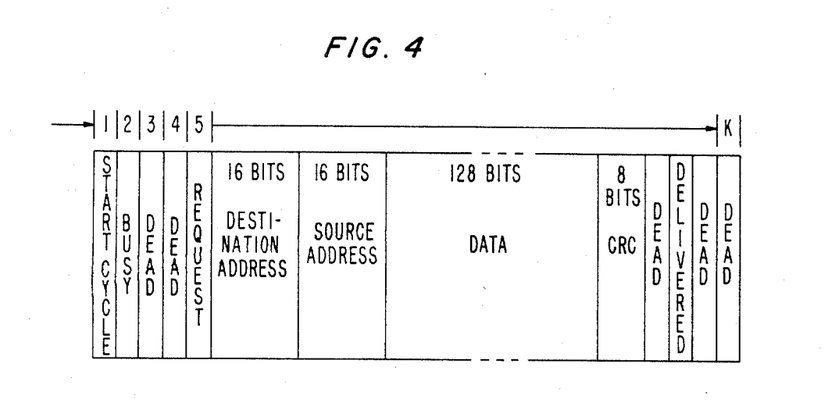
FIG. 4 illustrates a typical packet format for use with the network of FIG. 1.

The manner in which data signals are transmitted on paths 110 and 160 is illustrated in FIG. 2. FIG. 3 illustrates synchronizing digital signals/sync burst which is transmitted by station 170-1 to synchronize the other stations for reception and transmission of packets; and FIG. 4 illustrates the format of packets which are transmitted between stations via paths 110 and 160. FIG.'s 2 and 3 are further described in the previously mentioned copending application which should be consulted for further details concerning FIG.'s 2 and 3.

Stations 170-2 and 170-3 are common resources on the network and are both equally capable of providing predefined operations which other stations on the network need performed. If the network is used to communicate packetized voice between telephones interconnected to the network via stations, then the common resources could be telephones in a telephone hunting group or telephone trunks to central offices also in a hunting group. In case of a telephone trunk, any station on the network needing to make a telephone call through the central office uses a trunk attached to either station 170-2 or 170-3. In addition, the common resources could be a group of distributed computers all of which are programmed to do a particular task. One task which could be assigned to such a group of computers is the task of executing a word processing program. Upon receiving a request and the necessary information from a station on the network, a selected computer of the group individually executes the word processing program on the information received from the requesting station. Upon completion of the task, the results would be transmitted back to the requesting station or to a station with an attached printer.

The hunting for common resources attached to stations 170-2 and 170-3 is now explained in greater detail. Stations 170-2 and 170-3 each have a unique address. If the latter is inserted into the destination address field of a packet such as illustrated in FIG. 4, the address designated station responds by accepting that packet. In addition, stations 170-2 and 170-3 also have a common address to which they respond in order to implement the hunting function. Whenever any station detects a destination address which designates that station, the station changes the delivered bit in the delivered bit field to a "1" state indicating that the packet has been accepted by the station from the network.

A hunt group containing stations 170-2 and 170-3 functions by another station on the network transmitting a packet on transmit path 110 having the common address of stations 170-2 and 170-3. The transmitted packet is communicated from path 110 to path 160 via path 140. For example, if station 170-1 transmits such a packet, station 170-3, if it is not busy, responds to this packet by reading the packet and setting the delivered bit to a "1". Station 170-3 would receive the packet first since read operations are performed from path 160. Station 170-2 also responds to the packet, but upon detecting that the delivered bit is a "1" discards the packet. If station 170-3 is busy, then station 170-2 responds to the packet upon detecting that the delivered bit is a "0". By both stations 170-2 and 170-3 having unique addresses, another station such as station 170-1 can directly communicate with either one of the stations independent of the other.

Figure 5:
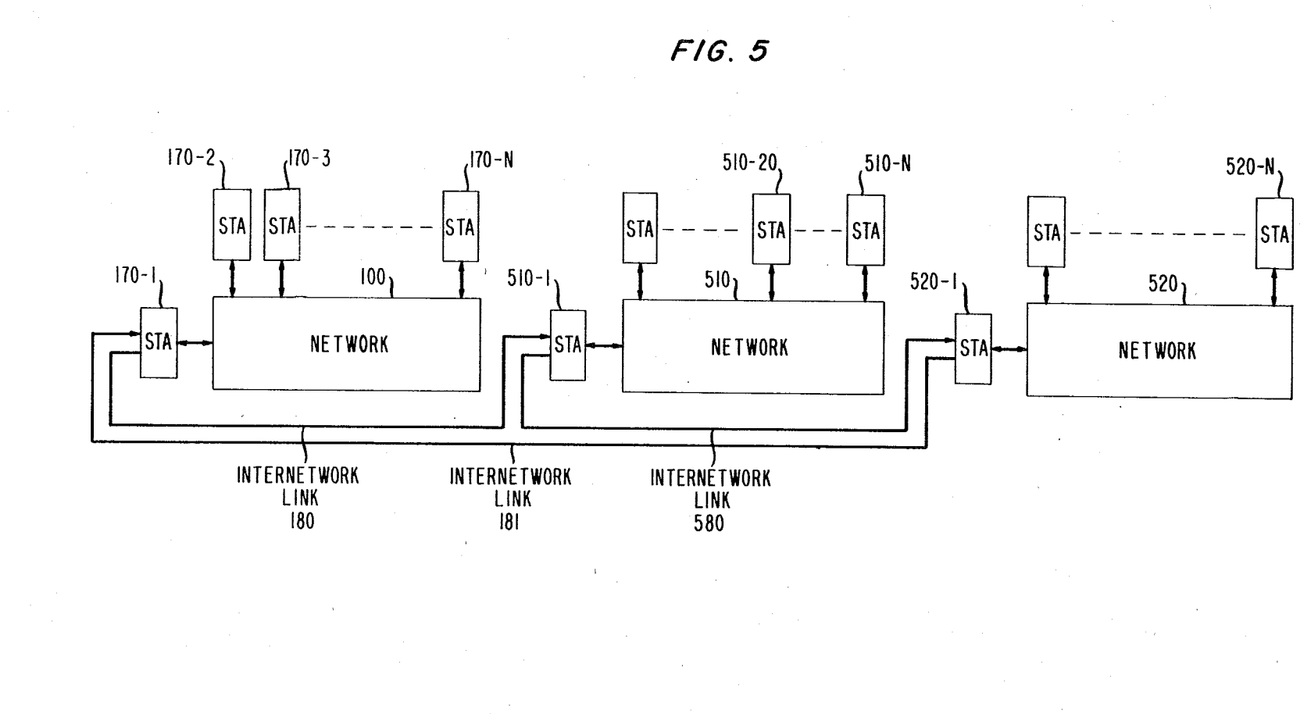
FIG. 5 illustrates, in block diagram form, a packet switching system comprising a plurality of packet switching networks which utilize the present invention.

FIG. 5 illustrates the manner in which a plurality of networks are interconnected utilizing the internetwork links such as internetwork link 180. The following example illustrates the manner in which the internetwork communication of packets is accomplished. Assuming that station 170-2 transmits a packet on network 100 with an address designating station 510-20 on network 510. Since none of the stations on network 110 will respond to this packet, a "1" will not be inserted into the delivered bit field. When the packet on path 160 is detected by station 170-1 as not having the delivered bit set to a "1", station 170-1 automatically transmits this packet via internetwork link 180 to station 510-1. Station 510-1 then retranmits the packet on network 510. Since the address designates station 510-20, the latter responds to the address by reading the packet and inserting a "1" into the delivered bit field. Utilizing this mechanism, it is possible to transmit packets from network 100 to network 520. Since if a station on network 510 does not insert a "1" into the delivered bit field, station 510-1, automatically transmits that packet to network 520 via internetwork link 580. Internetwork transmission also can take place from network 510 to network 100 via internetwork link 580, network 520, and internetwork link 181.

Figure 6:
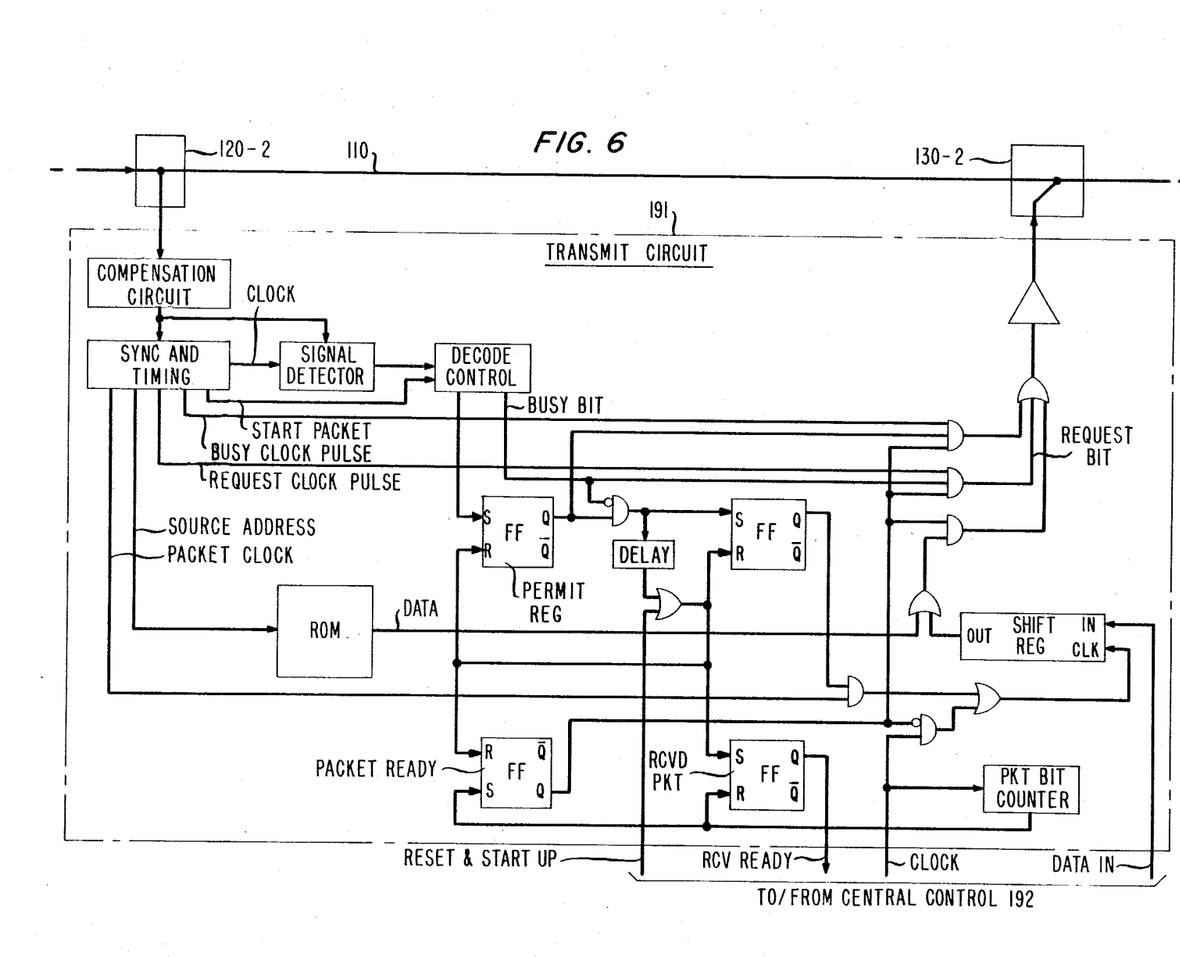
FIG. 6 is a detailed block diagram of transmit circuit 191 of station 170-2.

FIG. 6 illustrates in greater detail transmit circuit 191 which allows station 170-2 to read control information from transmit path 110 and transmit control and data information on transmit path 110. The other transmit circuits illustrated in FIG. 1 are identical in design to circuit 191. Transmit circuit 191 is similar in design and operation to a circuit disclosed in the above incorporated application by J. O. Limb which should be consulted for further details on the operation of circuit 191. Circuit 191 reads the busy and request clock pulses from path 110 and performs the necessary functions as required by the protocol described in the above incorporated application. This protocol allows station 170-2 to transmit information requesting access to path 110; and once, station 170-2 gains access to path 110 to transmit a packet which is received from central control 192.

Figure 7:
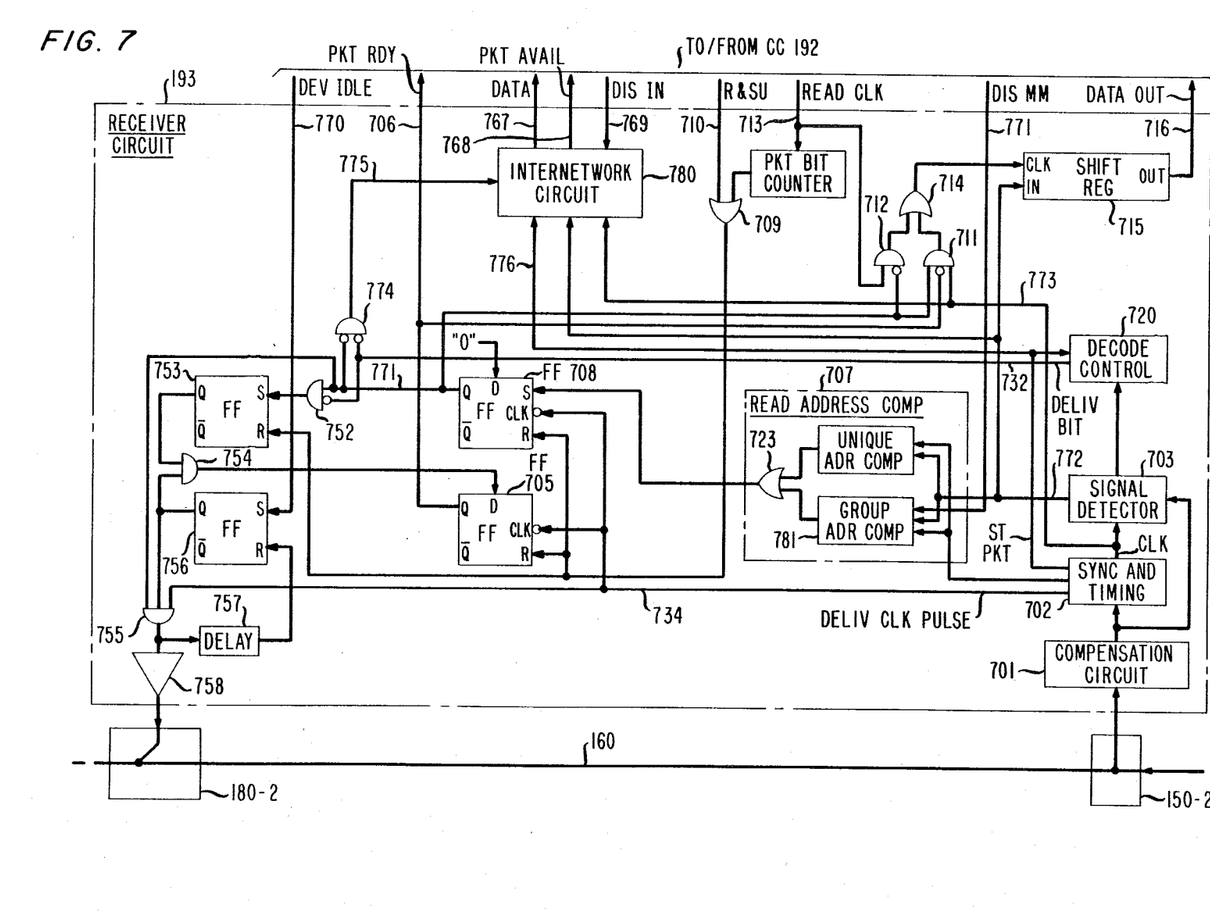
FIG. 7 is a detailed block diagram of receive circuit 193 of station 170-2.

FIG. 7 illustrates in greater detail receive circuit 193 which allows station 170-2 to receive the delivered bit and data information from path 160 and to write the delivered bit onto path 160. Receive circuit 193 is identical in design to the other receive circuits illustrated in FIG. 1. The functions performed by any receive circuit are determined by the state of the disable internetwork signal transmitted via conductor 769, the device idle signal transmitted via conductor 770, and the disable multi-match signal transmitted via conductor 771. All of the previous signals are generated by central control 192. If a receive circuit is to perform the functions of a hunt group, which is the case of station 170-2, then the disable multi-match signal is not transmitted via conductor 771 and the device idle signal is only transmitted via 770 when the central control is capable of accepting another packet specifying the hunt group function. The disable internetwork signal is always transmitted via conductor 769 unless the station is interconnecting its network with another network as is the case of station 170-1. A station which is not in a hunt group and is not connected to an internetwork link such as station 170-i has both disable signals being continuously transmitted as well as the device idle signal.

The following description configures the disable signals and the device idle signal for receive circuit 193 so that it performs the hunt group function. In this situation, the disable internetwork signal is transmitted to internetwork circuit 780 disabling the latter. In addition, since the disable multi-match signal is not transmitted via conductor 771, group address compare circuit 781 of read address compare circuit 707 is enabled for detecting the group address.

Receive circuit 193 upon the reception of a packet first interrogates the address field of that packet to determine if the address field contains the unique address of station 170-2 or the group address. If the packet field contains one of these two addresses, then the packet is shifted into shift register 715. After the entire packet has been received, if the delivered bit is a "0", which indicates that the packet has not been delivered, then a packet ready signal is transmitted via conductor 706 to central control 192. Central control 192 responds to the packet ready signal by transmitting read clock signals via conductor 713 which cause the information stored in shift register 715 to be transferred to central control 192 via conductor 716. In addition, after an entire packet had been transferred to central control 192, the proper circuitry within receive circuit 193 is reset. In addition, when one of the two addresses is detected, the delivered bit field of the packet is automatically written by receive circuit 193 via conductor block 190-2.

Consider now in greater detail the operation of receive circuit 193 during the reception of a packet from path 160. Sync and timing block 702 derives all the necessary timing signals from the signals being received from path 160. In response to the signals generated by block 702 and the information being transmitted on path 160, signal detector 703 extracts the data being transmitted via path 160. Decode control 720 transmits a pulse via conductor 732 during the time that the delivered bit field of the packet is present in block 150-2 indicating the state of the delivered bit. As a packet is being received, read address compare 707 determines if the contents of the address field match the unique address of station 170-2 or the group address. If one of these two addresses is detected, read address compare 707 transmits a "1" on conductor 723. Flip-flop 708 is responsive to a "1" on conductor 723 to enter the set state and consequently to transmit a "1" on conductor 771 to AND gate 711. The function of AND gate 711 is to clock the data from the packet which is being retransmitted by signal detector 703 on conductor 772 into shift register 715 if the central control 192 is not presently extracting data from shift register 715. If the central control is presently extracting data from shift register 715, then flip-flop 705 is in the set state as will be described later. If flip-flop 705 is not set, then AND gate 711 is enabled and retransmits the clock pulses which are generated and transmitted via conductor 773 by sync and timing block 702 to shift register 715 via OR gate 714.

When the data is first being shifted into shift register 715, it is not known whether or not this packet has been delivered or not. This fact is determined by the state of the delivered bit field. The delivered bit field is the last field of the packet. When the delivered bit field is detected by decode control 720, decode control 720 transmits the state of that field on conductor 732. If the delivered bit is a "0" this indicates that the packet has not yet been delivered. In response to flip-flop 708 being set and the delivered bit being a "0", flip-flop 753 is set via AND gate 752. Flip-flop 753 being set indicates that packet had not been previously delivered. When flip-flop 753 is set, flip-flop 705 is set at the end of the packet by the negative transition of the delivered clock pulse on the clock input of flip-flop 705 which causes the latter to store the output state of AND gate 754 which is a "1" since the states of flip-flops 753 and 756 transmitted to AND gate 754 are "1's". When set, flip-flop 705 transmits the packet ready signal via conductor 706 to central control 192. Flip-flop 756 had previously been set by the central control 192 transmitting the device idle signal via conductor 770 to flip-flop 756. Flip-flop 708 is reset at the end of the packet by the negative transition of the delivered clock pulse on the clock input of flip-flop 708 which causes the latter to store the "0" input connected to the D input of flip-flop 708.

Since the packet has now been delivered to station 170-2, it is necessary to write a "1" into the delivered bit field. This is done via AND gate 755, cable drive 758, and connector block 190-2. AND gate 755 is responsive to flip-flop 708 being set indicating that a packet is presently being transferred into shift register 715, flip-flop 756 being set indicating that central control 192 is idle, and a "1" being transmitted on conductor 734 indicating that the delivered bit field is presently positioned in connector block 190-2 to write a "1" into the delivered bit field. When the delivered bit field is written by AND gate 755, flip-flop 756 is reset via delay block 757.

The receive circuit 196 of station 170-1 is identical to receive circuit 193. However, the disable internetwork signal is not transmitted via a conductor corresponding to conductor 769, and the device idle signal is permanently transmitted via a conductor corresponding to conductor 770, and the disable multi-match signal is permanently transmitted via a conductor corresponding to conductor 771. Since the disable internetwork signal is not being transmitted, the internetwork circuit of circuit 196 is active, and its operation is now described in detail.

Figure 8:
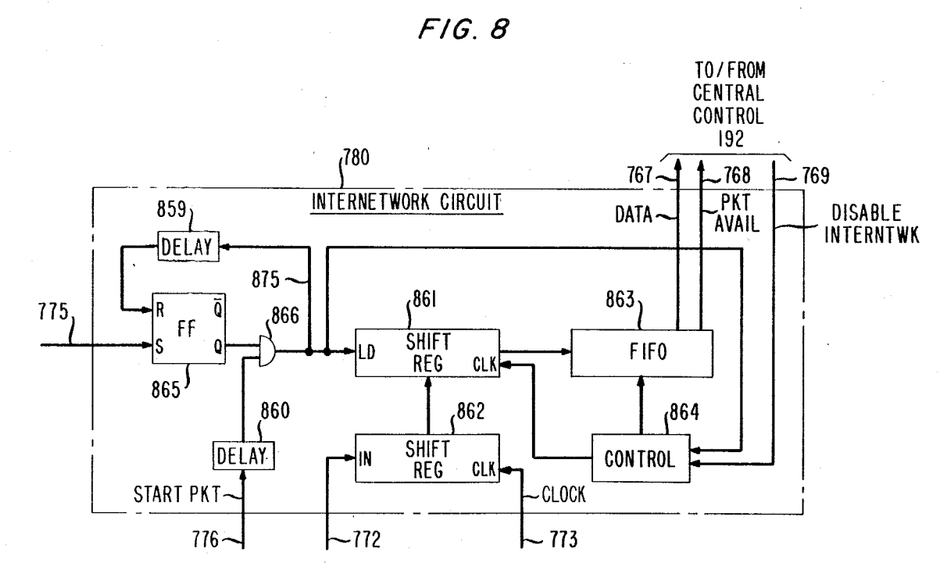
FIG. 8 is a detailed block diagram of internetwork circuit 780 of receive circuit 196.

The internetwork circuit is illustrated in greater detail in FIG. 8 and is described as being part of receive circuit 196. The states of the disable internetwork, disable multi-match, and device idle signals, disable the hunt group functions and enable receive circuit 196 to receive any packet whose delivered bit field contains a "0" indicating that the packet has not been delivered. Any packet having station 170-1's unique address is handled in a manner similar to that just described for station 170-2. Any packet whose address is not identical to the unique address of station 170-1 and whose delivered bit has not been set to a "1" is transferred into shift register 861 and from there to the central control 195 via FIFO 863. From central control 195, the packet is initially stored in buffer 198 before transmission on interconnection link 180.

The following explains these operations in greater detail. As each packet is received, it is automatically shifted into shift register 862 by clock signals transmitted via a conductor similar to conductor 773. If the delivered bit field contains a "0" and a flip-flop similar to flip-flop 708 of circuit 196 has not been set then flip-flop 865 is set via an AND gate similar to AND gate 774 of circuit 196. If the flip-flop similar to flip-flop 708 was set, indicating that the packet is intended for station 170-1. Flip-flop 865 being set identifies the fact that the packet presently being received is to be transferred to another network. At the end of the packet which is indicated by a signal from delay block 860, the packet contained in shift register 862 is transferred to shift register 861 by AND gate 866 transmitting a "1" on conductor 875. The transmission of a "1" on conductor 875 automatically resets flip-flop 865 via delay block 859. Control block 864 is responsive to the "1" transmitted via conductor 875 to transfer the information in shift register 861 into FIFO 863. Once the packet flows through FIFO 863, a packet available signal is transmitted to central control 195 of station 170-1. The latter then extracts packet information from FIFO 863 via cable 867. Central control 195 transfers this packet via interconnection link 180 to network 510 of FIG. 5. Any packet received by station 170-1 from internetwork link 181 is retransmitted on transmit path 110 via buffer 198, central control 195, transmit circuit 194, and block 130-1.

Figure 9:
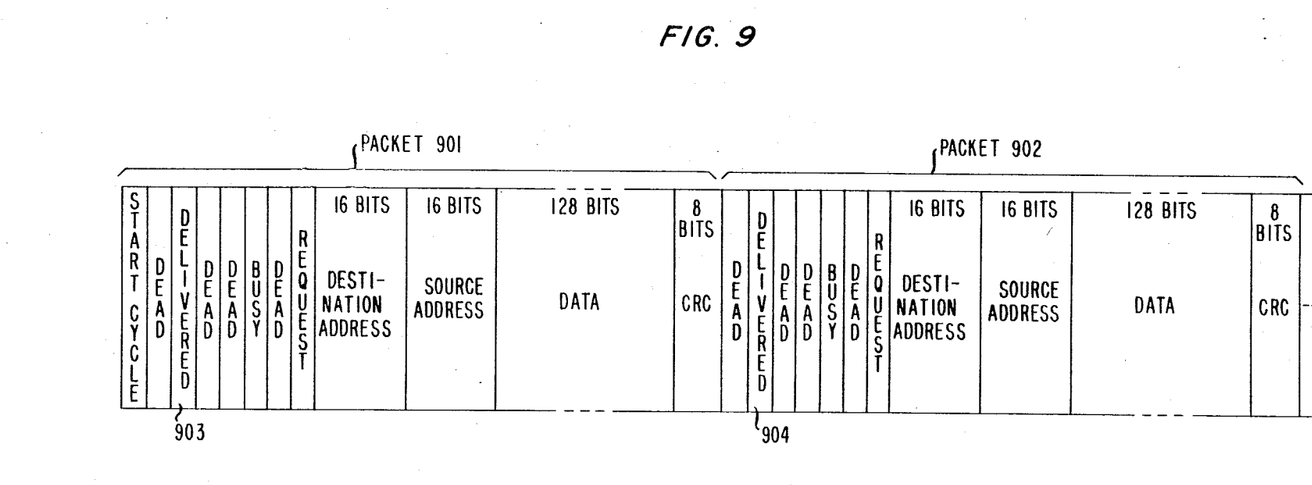
FIG. 9 illustrates an alternate packet format for use with the network of FIG. 1.

FIG. 9 illustrates another arrangement for the fields of packets transmitted via the networks shown in FIG. 5. Transmit circuits such as transmit circuit 191 function in the identical manner for the packet format illustrated in FIG. 9 as for the previously described packet format illustrated in FIG. 4. The receiver circuits such as receiver circuit 193 function in a similar manner for the packet format illustrated in FIG. 9 as for the previously described packet format illustrated in FIG. 4. The differences are explain by the following example. When receiver circuit 193 responds to packet 901 of FIG. 9, the circuit does not use delivered bit field 903, but rather awaits the arrival of delivered bit field 904 of packet 902 and use the contents of field 904 as the delivery information for packet 901. Similarly, when circuit 193 inserts information into a delivered bit field for packet 901, that information is inserted into field 904 not field 903. Circuit 193 is designed to function with either format and is responsive to a received packet to perform the proper functions as determined by the packet's format.

It is to be understood that the above-described embodiment is merely illustrative of the principles of this invention; other arrangements may be devised by those skilled in the art without departing from the spirit and scope of the invention. In particular, one skilled in the art could readily foresee application of this invention to the previously described FASNET network.

What is claimed is:

1. A packet switching system having a plurality of stations and a plurality of networks for communicating packets between said plurality of stations and a plurality of interconnection links between said networks;

each of said packets comprising delivery signals and address signals;

one of said stations comprising means responsive to a set of said address signals and a first set of said delivery signals for reading one of said packets from one of said networks;

said one of said stations further comprising means responsive to said reading for inserting a second set of said delivery signals into said one of said packets on said one of said networks thereby indicating that said one of said packets has been read from said one of said networks; and said one of said stations further comprises means responsive to all other sets of said address signals and said first set of said delivery signals for transferring other ones of said packets to a second one of said networks via one of said interconnection links.

2. The packet switching system of claim 1 wherein said transferring means comprises means for detecting said all other sets of said address signals and said first set of said delivery signals to generate detect signals;

means responsive to receipt of all packets for reading said packets; and means responsive to said detect signals for storing the read packets.

3. The packet switching system of claim 2 wherein said storing means comprises means having capacity for storing only one of said read packets;

means for storing on a first-in first-out basis a plurality of said read packets; and means responsive to said detect signals for transferring the ones of said packets to the first-in first-out storing means from the limited capacity storing means.

4. The packet switching system of claim 3 wherein said transferring means further comprises means responsive to the presences of said read ones of said packets in said first-in first-out storing means for transmitting said read ones of said packets to said second one of said networks via said one of said interconnection links.

5. The packet switching system of claim 1 comprising a plurality of common resource units and a group of said stations each comprising means for individually connecting one of said common resource units to said one of said networks;

each of said common resource units comprising means for generating an idle signal upon each of said common resource units being idle;

each of said group of stations responsive to a group set of said address signals and said first set of said delivery signals and the idle signal from the connected one of said common resource units for reading another one of said packets from said one of said networks; and said connected one of said common resource units further comprising means responsive to said read other one of said packets for performing predefined operations with said read other one of said packets.

6. The packet switching system of claim 5 wherein each station of said group further comprises means responsive to a set of said packets each containing an individual set of address signals for reading each packet of said set of said packets.

7. A packet switching system having a plurality of switching networks for communicating packets and a plurality of links for interconnecting said networks one of said switching network comprise a station responsive to a set of address signals from one of said packets and a first set of delivery signals for reading said one of said packets to perform predefined operations with the latter; and said station further comprising means responsive to all other sets of addresses signals from other ones of said packets and a second set of said delivery signals to read said other ones of said packets for transmitting said other ones of said packets to another one of said networks via one of said links.

8. The packet switching system of claim 7 wherein said transferring means comprises means for detecting said all other sets of said address signals and said first set of said delivery signals to generate detect signals; and means responsive to receipt of all packets for reading said packets; and means responsive to said detect signals for storing the read packets;

9. The packet switching system of claim 8 wherein said storing means comprises means having capacity for storing only one of said read packets;

means for storing on a first-in first-out basis a plurality of said read packets; and means responsive to said detect signals for transferring the read ones of said packets to the first-in first-out storing means from the limited capacity storing means.

10. The packet switching system of claim 7 wherein said other one of said networks comprises a station responsive to receipt of said other ones of said packets from said one of said links for transmitting said other ones of said packets on said other one of said networks.

11. The packet switching system of claim 7 wherein said one of said packets includes said first set of said delivery signals.

12. The packet switching system of claim 7 wherein a subsequent one of said packets include said first set of said delivery signals.

13. A packet switching network for communicating packets, comprising a group of stations each responsive to a first set of delivery signals and packets including a group set of address signals for performing a predefined operation;

another station for performing a set of operations including said predefined operation;

said other station comprising means for transmitting one of said packets comprising said group set of address signals and further comprising means for transmitting said first set of said delivery signals to perform said predefined operation; and an idle one of said group of said stations responsive to receipt of said one of said packets and said first set of said delivery signals for performing said predefined operation and further comprises means responsive to said receipt for replacing said first set of said delivery signals with a second set of said delivery signals thereby indicating to other stations in said group that said predefined operation has been performed with said one of said packets.

14. The packet switching system of claim 13 wherein each station of said group further comprises means responsive to a set of said packets each containing an individual set of address signals for reading each packet of said set of said packets.

15. The packet switching system of claim 13 wherein said one of said packets includes said first set of said delivery signals.

16. The packet switching system of claim 13 wherein a subsequent one of said packets includes said first set of said delivery signals.

* * * * *